United States Patent
Jale et al.

(10) Patent No.: US 6,461,412 B1
(45) Date of Patent: Oct. 8, 2002

(54) MONOLITH ADSORBENTS FOR AIR SEPARATION PROCESSES

(75) Inventors: Sudhakar R. Jale, Scotch Plains; Frank R. Fitch, Bedminster; Dongmin Shen, Berkeley Heights, all of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/710,022

(22) Filed: Nov. 9, 2000

Related U.S. Application Data

(63) Continuation-in-part of application No. 09/664,568, filed on Sep. 18, 2000.

(51) Int. Cl.$^7$ ................................................ B01D 53/04
(52) U.S. Cl. .......................... 95/130; 95/902; 502/79; 162/164.2
(58) Field of Search .......................... 95/90, 96, 130, 95/902; 96/153, 154; 502/407, 439, 79, 73, 232; 162/164.2; 423/328.1, 716; 427/267, 288

(56) References Cited

U.S. PATENT DOCUMENTS

| | | | |
|---|---|---|---|
| 3,954,672 A | * | 5/1976 | Somers et al. |
| 4,012,206 A | | 3/1977 | Macriss et al. |
| 4,134,743 A | | 1/1979 | Macriss et al. |
| 4,800,187 A | * | 1/1989 | Lachman et al. ............. 502/64 |
| 5,203,887 A | * | 4/1993 | Toussaint ..................... 95/130 |
| 5,389,357 A | * | 2/1995 | Sato et al. ................... 423/714 |
| 5,496,397 A | | 3/1996 | Fischer et al. |
| 5,580,369 A | | 12/1996 | Belding et al. |
| 5,650,221 A | | 7/1997 | Belding et al. |
| 5,660,048 A | | 8/1997 | Belding et al. |
| 5,685,897 A | | 11/1997 | Belding et al. |
| 5,827,577 A | | 10/1998 | Spencer |
| 5,916,836 A | * | 6/1999 | Toufar et al. ................. 502/86 |
| 5,922,107 A | * | 7/1999 | Labasque et al. ............. 95/130 |
| 6,143,057 A | * | 11/2000 | Bulow et al. ................. 95/96 |
| 6,231,644 B1 | * | 5/2001 | Jain et al. ..................... 95/96 |
| 6,274,528 B1 | * | 8/2001 | Labasque et al. ............. 502/79 |

FOREIGN PATENT DOCUMENTS

| | | |
|---|---|---|
| EP | 0 297 542 A2 | 1/1989 |
| EP | 0667183 A1 * | 8/1995 |
| EP | 0 826 631 A1 | 3/1998 |

OTHER PUBLICATIONS

Database Derwent Publications Ltd., XP002186269 & RU 2 081 231 C (Volzhsk Cellulose Paper Ind Res Inst), Jun. 10, 1997 *abstract*.

Database Derwent Publications Ltd., XP–002186217 & JP 63 093350 A (Asumi Roshi KK), Apr. 23 1988 *Abstract*.

Database Compendex Online,Li Y Y et al.: "Zeolite Monoliths for Air Separation. Part 1: Manufacture and Characterization," database accession No. EIX99154568904 XP002186270 *abstract*.

Patent Abstracts of Japan, vol. 009, No. 091 (C–277), Apr. 19, 1985 & JP 59 223220 A (Shintouhoku Kagaku Kogyo KK; others: 01) Dec. 15, 1984 *abstract*.

* cited by examiner

*Primary Examiner*—David A. Simmons
*Assistant Examiner*—Frank M. Lawrence
(74) *Attorney, Agent, or Firm*—Philip H. Von Neida; Salvatore P. Pace

(57) ABSTRACT

An improved method for preparing an adsorbent containing sheet is disclosed. Deionized water is employed in a slurry during preparation of the adsorbent containing sheet. The treated adsorbent monoliths provide improved sorption capacity and $N_2/O_2$ selectivity when employed in gas separation processes.

40 Claims, No Drawings

MONOLITH ADSORBENTS FOR AIR SEPARATION PROCESSES

This application is a continuation-in-part of Ser. No. 09/664,568, filed Sep. 18, 2000.

FIELD OF THE INVENTION

The present invention provides for methods for preparing an adsorbent containing sheet, their preparation into adsorbent monoliths and their subsequent use in air separation processes. More particularly, the present invention relates to the use of alkali or alkaline metal salts or mixtures thereof in preparing zeolite containing adsorbent sheets which can be used to construct monolith structures.

BACKGROUND OF THE INVENTION

Cyclic adsorption processes are frequently used to separate the components of a gas mixture. Typically, cyclic adsorption processes are conducted in one or more adsorbent vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out.

In any cyclic adsorption process, the adsorbent bed has a finite capacity to adsorb a given gaseous component and, therefore, the adsorbent requires periodic regeneration to restore its adsorption capacity. The procedure followed for regenerating the adsorbent varies according to the process. In VSA processes, the adsorbent is at least partially regenerated by creating vacuum in the adsorption vessel, thereby causing adsorbed component to be desorbed from the adsorbent, whereas in PSA processes, the adsorbent is regenerated at atmospheric pressure. In both VSA and PSA processes, the adsorption step is carried out at a pressure higher than the desorption or regeneration pressure.

A typical VSA process generally comprises of a series of four basic steps that includes (i) pressurization of the bed to the required pressure, (ii) production of the product gas at required purity, (iii) evacuation of the bed to a certain minimum pressure, and (iv) purging the bed with product gas under vacuum conditions. In addition a pressure equalization or bed balance step may also be present. This step basically minimizes vent losses and helps in improving process efficiency. The PSA process is similar but differs in that the bed is depressurized to atmospheric pressure and then purged with product gas at atmospheric pressure.

As mentioned above, the regeneration process includes a purge step during which a gas stream that is depleted in the component to be desorbed is passed countercurrently through the bed of adsorbent, thereby reducing the partial pressure of adsorbed component in the adsorption vessel which causes additional adsorbed component to be desorbed from the adsorbent. The nonadsorbed gas product may be used to purge the adsorbent beds since this gas is usually quite depleted in the adsorbed component of the feed gas mixture. It often requires a considerable quantity of purge gas to adequately regenerate the adsorbent. For example, it is not unusual to use half of the nonadsorbed product gas produced during the previous production step to restore the adsorbent to the desired extent. The purge gas requirement in both VSA and PSA processes are optimization parameters and depend on the specific design of the plant and within the purview of one having ordinary skill in the art of gas separation.

Many process improvements have been made to this simple cycle design in order to reduce power consumption, improve product recovery and purity, and increase product flowrate. These have included multi-bed processes, single-column rapid pressure swing adsorption and, more recently, piston-driven rapid pressure swing adsorption and radial flow rapid pressure swing adsorption. The trend toward shorter cycle times is driven by the desire to design more compact processes with lower capital costs and lower power requirements. The objective has been to develop an adsorbent configuration that demonstrates a low pressure drop, a fast pressurization time and an ability to produce the required purity of oxygen.

For the details as to the manufacture of adsorbent sheets and the construction of monoliths used for dehumidification purposes, reference is made to U.S. Pat. Nos. 5,660,048, 5,660,221, 5,685,897, 5,580,369 and 4,012,206. The adsorption wheels are fabricated from an adsorbent paper which contains a adsorbent material. The adsorbent paper is prepared from a natural or synthetic fiber material. This fiber material can be combined with the adsorbent and wet-laid into a continuous sheet or handsheet. This wet-laying is achieved by forming a slurry of the fiber, the adsorbent and binder components in water. This slurry is then transferred to a handsheet mold or to the head box of a continuous wire paper machine for introduction onto the Fourdrinier or Twin-Wire paper machine. The adsorbent can contain zeolites, silica gels and/or alumina.

In a typical papermaking process, plenty of water from rivers, lakes or municipality supplies is used. When zeolite needs to be incorporated into the paper, these large quantities of water will have two negative effects on the performance of zeolite in a separation process. The first arises from the ion exchange of cations between the process water and zeolite and second one is the hydrolysis of zeolite cations leading to a protonic exchange. If the papermaking process is carried out at higher temperatures, the hydrolysis of zeolitic cations will be even more significant. Depending on the type of separation or catalytic application, the modification in chemical composition of zeolite can have dramatic effect on the performance.

Li-containing molecular sieves are widely used in air separation process to selectively adsorb $N_2$ over $O_2$, thereby producing $O_2$ in a continuous process in a multiple bed operation. If the process water contains cations such as Na, Ca and Mg, which are found in typical water supplies the exchange of these cations into Li-sieve will lead a decrease in the Li content of zeolite and consequently a decrease on the sorption capacity of $N_2$ and a decrease in $N_2/O_2$ selectivity. However, if the sorbate molecule has stronger interaction with cations, such as water as in a dehumidification application, the partial ion-exchange of zeolite cations from the process water may not have significant influence on the performance of the adsorbent. Hence, in an adsorption process involving weaker interactions, retaining the preferred original composition of the zeolite during the papermaking process is very crucial.

The present invention provides means to keep the original composition of the adsorbent by preventing the leaching of cations from the zeolite both during the preparation of stock preparation, and during and after the manufacture of the paper. It also describes a method for decreasing the hydrolysis of zeolite cations, when a slurry containing zeolite is coated or impregnated on to various substrates.

SUMMARY OF THE INVENTION

The present invention provides for an improved method for preparing an adsorbent containing sheet by the addition of alkali and alkaline metal salts or mixtures thereof to the adsorbent containing slurry sheet. These salts can be added to either the slurry during its preparation or by post-treating the monolithic structures with an aqueous solution of the metal salt. It also discloses using deionized water in place of river or lake water, which were typically used in paper industry.

The present invention further provides for an improvement by adding the metal salt to a zeolite containing slurry which will be coated to a substrate such as a flat sheet, corrugated sheet, metal foil or mesh.

The monolith adsorbents that have been prepared in this manner demonstrate improved nitrogen capacity and nitrogen/oxygen selectivity in air separation processes such as vacuum swing adsorption (VSA) or pressure swing adsorption (PSA) processes.

DETAILED DESCRIPTION OF THE INVENTION

The present invention provides for a method of preparing an adsorbent containing sheet comprising the steps of:

(a) mixing together a slurry of fiber, adsorbent, retention aid, and a binder in deionized water;

(b) adding to the slurry an alkali or alkaline metal salt or mixtures thereof;

(c) removing the water from the slurry; and (d) forming the adsorbent containing sheet.

In an alternative embodiment, a monolith adsorbent is prepared by washing the monolith adsorbent with a solution of an alkali or alkaline metal salt or mixtures thereof. In a further alternative embodiment, the slurry may comprise water, fiber and adsorbent and the alkali or alkaline metal salt or mixtures thereof is added to the slurry prior to the addition of the other papermaking chemical additives such as dry-strength adhesives, wet strength resins, defoamers, retention and drainage aids. Although these methods of addition are preferred, the metal salt can be added at any stage during the slurry or stock preparation process.

The present invention also provides for an improved method of preparing and adsorbent containing sheet from a slurry comprising a mixture of fiber, binder, adsorbent and retention aid in deionized water. The improved slurry may also be applied to a substrate resulting in an improved adsorbent.

In the process of the present invention, a slurry is first formed using deionized (DI) water. The mixing container is typically a mild steel or stainless steel tank or a polymer-lined vessel. The use of DI water prevents cations contained in other sources of water from replacing the cations in the adsorbent zeolite. A slurry is made by adding fiber, which can be either synthetic or natural, to the DI water. The adsorbent material, which is typically a zeolite, is then added to the fiber slurry either in the powder form or by mixing with water. In the following stages, a binder, a retention aid and optionally a pore filling agent are added.

The synthetic organic polymeric fibers include aromatic polyamides, polyesters, polyvinyl chlorides, nylons, acrylics, polyethylenes, polypropylenes, acrylonitrile homopolymers, copolymers with halogenated monomers, styrene copolymers, and mixtures of polymers (polypropylene with low-density polyethylene, and high density polyethylene with polystyrene). The inorganic fibers include glass or metal fibers and rock wool etc. The natural fibers include wood pulp such as cellulose. Combination of organic and inorganic fibers can also be used.

The retention aid can be any material that is added to the stock to increase the retention of adsorbent. Various types of additives such as inorganic salts and organic polyelectrolytes can be useful as retention aids in papermaking.

In addition to retention aids, a binder can be added to add strength and specialized properties, such as flexibility to the finished sheets.

The preferred polymeric organic binders are starch, polyvinyl alcohols, acrylics, polyurethane, polyethylene glycol, polypropylene glycol, polyacrylic acid, polyamide and polyamine. Non polymeric binders having a functionality of a carboxylic acid, an aldehyde, an amino acid, an amine, and an amine can also be used. In general, these polymeric and non-polymeric binders have a hydrogen bonding functionality or coordinate covalent bond forming functionality to bind to fibers and zeolite particles. Inorganic binders such as silica and mineral silicates can also be used.

The adsorbent material is preferably a zeolite of type X, type A, ZSM-3, EMT, EMC-2, ZSM-18, ZK-5, ZSM-5, ZSM-11, β, L, chabazite, offretite, erionite, mordenite, gmelinite, mazzite, and mixtures thereof. The cations in zeolites can be exchanged to modify the adsorption behavior. The selectivity for a given sorbate molecule depends on both the zeolite structure as well as the number and nature of the cations in zeolite. Hence same zeolite can be applied in different separation processes by exchanging with other cations. Cation exchange can also modify the pore size of the zeolite enabling the separation of molecules based on the size.

The temperature at which the stock preparation and handsheet making will be done depends on the nature of binder, flocculation agent, pore filling agent or any other chemical adhesive. Typically the process is carried out in between 25 and 80° C.

The dried adsorbent material is then formed into the appropriate shape. In one embodiment of the invention, a flat sheet was bonded to a corrugated sheet to form a single-faced corrugated sheet, which is then spirally wrapped to make a monolith structure containing plurality of parallel channels. In another embodiment of the invention, the flat sheets are spirally wound with alternating layers of spacers.

The improvement comprises adding to the slurry an alkali or alkaline metal salt or mixtures thereof. The metal salt will inhibit the leaching of cations from the adsorbent material. Additionally the metal salt will maintain the pH in a basic range and will inhibit the hydrolysis of cations in the adsorbent material.

The retention of adsorbent in the handsheets is hardly effected by the addition of these salts. Typically, handsheets can contain up to 90 wt. % of adsorbent, the remainder being fibrous material and other chemical adhesives, mainly the binder.

The alkali or alkaline metal salts have cations that are selected from the group consisting of Group IA, Group IIA, Group IB, Group IIB and Group IIIB of the periodic table. The anions employed to form these metal salts are selected from the group consisting of hydroxide, chloride, nitrate, sulfate, carbonate, alkoxide and acetate.

In an alternative embodiment, the final formed monolith structure is washed with an alkali or alkaline metal salt or mixtures thereof. The salt solution may be applied as a wash by spraying or it may be applied by immersing the formed monolith structure into a solution of the salt.

In another alternative embodiment, a slurry which comprises a binder, an adsorbent, and preferably a pore filling agent and a suspending agent in deionized water can be applied to a substrate. The improvement lies in adding to this slurry an alkali or an alkaline metal salt or mixtures thereof.

The substrate which can be a woven or non-woven material includes but is not limited to flat sheets, corrugated sheets, metal foils and meshes which can be metal, glass fiber or synthetic organic polymeric material. Typically the substrate will be about 0.005 inches to about 0.05 inches thick. The method of application can be by spraying the slurry solution on the substrate or by immersing or dipping the substrate into a container of the solution. The slurry can also be applied to the substrate by means of roller printing such as that described in U.S. Pat. No. 5,827,577.

The substrate is then used to construct monolith structures of any shape and size having abrupt radii and passageways so that the gas going through the passageways will come in contact with the adsorbent.

As described in U.S. Pat. No. 5,496,397, a suspending agent such as N-methyl-2-pyrrolidone, which helps maintain the adsorbent particles in suspension so that the adsorbent particles will not settle out and are evenly distributed in the coating mixture may be added. A pore filling agent such as isopropyl alcohol may also be added before a binder is added so that it prevents the occlusion of or blockage of pores by the binder.

The metal salt may be applied as an aqueous solution, generally made up from deionized water. The concentration of salt in the solution can be varied to impact the desired amount of cations for application to the slurry of formed monolith structure. Typically the metal salt is dissolved to make a solution in a range from about 0.001 N to about 5.0 N with a range of about 0.005 to about 1.0, preferred.

The monolith structure when finally formed may take on any design and shape for use in gas separation processes. The formed monolith structure may include as adsorbents zeolite type X, zeolite type A, ZSM-3, EMT, EMC-2, ZSM-18, ZK-5, ZSM-5, ZSM-11, β, L, chabazite, offretite, erionite, mordenite, gmelinite, and mazzite, as well as mixtures of these. Although various cationic forms of zeolites can be chosen, preferably, the adsorbent is a lithium-containing or lithium and bivalent cation-containing, or a lithium and trivalent cation containing zeolite of type A and X, which contains Si/Al molar ratio of 0.9 to 1.25, preferably 1.0 to 1.1, and most preferably with an Si/Al ration of about 1.0.

In the adsorption process embodiment of the invention, a component of a gas mixture that is more strongly adsorbed than other components of the gas mixture is separated from the other components by contacting the gas mixture with the adsorbent under conditions which effect adsorption of the strongly adsorbed component. Preferred adsorption processes include PSA, including vacuum swing adsorption (VSA), TSA and combinations of these.

The temperature at which the adsorption step of the adsorption process is carried out depends upon a number of factors, such as the particular gases being separated, the particular adsorbent being used, and the pressure at which the adsorption is carried out. In general, the adsorption step of the process is carried out at a temperature of at least about −190° C., preferably at a temperature of at least about −20° C., and most preferably at a temperature of at least about 0° C. The upper temperature limit at which the adsorption step of the process is carried out is generally about 400° C., and the adsorption step is preferably carried out at temperatures not greater than about 70° C., and most preferably carried out at temperatures not greater than about 50° C.

The adsorption step of the process of the invention can be carried out at any of the usual and well known pressures employed for gas phase temperature swing adsorption and pressure swing adsorption processes. Typically the minimum absolute pressure at which the adsorption step is carried out is generally about 0.7 bara (bar absolute), preferably about 0.8 bara and most preferably about 0.9 bara. The adsorption can be carried out at pressures as high as 50 bara or more, but is preferably carried out at absolute pressures, and preferably not greater than about 20 bara, and most preferably not greater than about 10 bar.

When the adsorption process is PSA, the pressure during the regeneration step is reduced, usually to an absolute pressure in the range of about 0.1 to about 5 bara, and preferably to an absolute pressure in the range of about 0.175 to about 2 bara, and most preferably to an absolute pressure in the range of about 0.2 to about 1.1 bara.

As indicated above, the process of the invention can be used to separate any two gases, provided that one of the gases is more strongly adsorbed by the adsorbents of the invention than is the other gas under either conditions of equilibrium or non-equilibrium, i. e., in the kinetic regime of a process. The process is particularly suitable for separating nitrogen from oxygen, nitrogen and argon from oxygen, carbon dioxide from air, dinitrogen oxide from air and for the separation of hydrocarbons, for example, the separation of alkenes, such as ethylene, propylene, etc., from alkanes, such as ethane, propane, etc., and the separation of straight-chain hydrocarbons from branched-chain hydrocarbons, e.g., the separation of n-butane from i-butane. Type A zeolites with appropriate cation compositions are particularly suitable for the separation of alkenes from alkanes, n-alkanes from i-alkanes and carbon dioxide from alkanes, alkenes and acetylene. The separation of these gases is preferably carried out at ambient temperature or higher, although the separation of nitrogen, oxygen and argon can be carried out at cryogenic temperatures.

It will be appreciated that it is within the scope of the present invention to utilize conventional equipment to monitor and automatically regulate the flow of gases within the system so that it can be fully automated to run continuously in an efficient manner.

The invention is further illustrated by the following examples in which, unless otherwise indicated, parts, percentages and ratios are on a weight basis.

EXAMPLE 1

Lithium and rare-earth containing LSX (LiRELSX) sample was made as disclosed in the EXAMPLE 1 of U.S. Pat. No. 5,464,467.

EXAMPLES 2–4

Li,RELSX sample prepared in Example 1 was agitated at 50° C. for 2 h in an aqueous solution with different concentrations of LiOH (Aldrich Chemical Co.). 5.0 g of zeolite was first dispersed in 250 ml of water and different amounts of LiOH salt was added to get the appropriate concentration. The concentration of LiOH solution and the resultant pH for each of the examples are summarized in Table 1.

TABLE 1

The concentration of LiOH solution and the pH in the preparation of LiRELSX samples.

| Example | LiOH concentration, M | slurry pH |
|---------|----------------------|-----------|
| 2 | 0.000 | 10.5 |
| 3 | 0.007 | 11.0 |
| 4 | 0.015 | 11.4 |

EXAMPLE 5

Adsorption isotherms of nitrogen ($N_2$) and oxygen ($O_2$) on the products of examples 1–4 were measured gravimetrically using Cahn 2000 Series microbalance enclosed in a stainless steel vacuum/pressure system. About 100 mg of samples carefully evacuated and its temperature increased to 450° C. at a rate of 1°–2° C. per minute. The adsorption isotherms for nitrogen and oxygen were measured at 25° C. in the pressure range 20–6900 mbar for nitrogen and 20–2000 mbar for oxygen and the data fitted to a single and multiple site langmuir isotherm model. The fits to the nitrogen data were used to calculate the effective capacity for nitrogen at 25° C. and $N_2/O_2$ selectivities. The effective nitrogen capacity defined as the difference between the nitrogen capacity at 1000 mbar and that at 300 mbar gives a good indication of the capacity of the adsorbent in a PSA process operated between upper and lower pressures in this range. The selectivities of the samples for nitrogen over oxygen in air at 300 and 1000 mbar and 25° C. were derived from the pure gas isotherms for nitrogen and oxygen using Langmuir mixing rules (Ref. e.g. A. L. Myers: AIChE: 29(4), (1983), p691–693). The usual definition for selectivity was used, where the selectivity (S) is given by:

$$S=(X_{N2}/Y_{N2})/(X_{O2}/Y_{O2})$$

where $X_{N2}$ and $X_{O2}$ are the mole fractions of nitrogen and oxygen, respectively, in the adsorbed phases, and $Y_{N2}$ and $Y_{O2}$ are the mole fractions of nitrogen and oxygen, respectively, in the gas phase.

The adsorption results for the samples from examples 1–4 are given Table 2.

TABLE 2

Adsorption capacities of LiRELSX powders washed with water containing different amount of LiOH*

| Sample Name | Effective $N_2$ capacity mmol/g | $N_2/O_2$ selectivity | |
|---|---|---|---|
| | | 1000 mbar | 300 mbar |
| LiRELSX-example 1 | 0.589 | 6.1 | 9.3 |
| LiRELSX-example 2 | 0.515 | 5.4 | 7.9 |
| LiRELSX-example 3 | 0.580 | 5.9 | 8.6 |
| LiRELSX-example 4 | 0.605 | 6.2 | 9.1 |

EXAMPLE 6

The samples from examples 1–4 were analyzed by Inductively Coupled Plasma Atomic Emission Spectroscopy (ICP-AES) using an ARL-3510 Sequential spectrometer. The relative Li content of these samples, washed in an aqueous solution containing amounts of LiOH, is compared with parent LiRELSX samples in Table 3. The relative Li content defined as the amount of Li present in the washed LiRELSX as compared to the parent LiRELSX sample.

TABLE 3

Composition of LiRELSX samples prepared in examples 1–4.

| Sample | Relative Li content |
|---|---|
| LiRELSX-example 1 | 1.000 |
| LiRELSX-example 2 | 0.912 |
| LiRELSX-example 3 | 0.968 |
| LiRELSX-example 4 | 1.027 |

EXAMPLE 7

A slurry was made by adding a fibrillated or non-fibrillated fiber to the DI water. An adsorbent containing slurry, prepared by adding DI water to LiRELSX zeolite, was then added to the above slurry containing fiber under stirring. A retention aid and a binder were added allowing fibers and adsorbent materials to flocculate so that they can be easily retained on the forming wire. The stock preparation is carried out at 47° C. The stock is added to the handsheet mold and water is drained by gravitational forces. The sheet thus formed is pressed by roller press to remove the water. The sheet was then dried at 100° C. for 5 min.

EXAMPLE 8

Example 7 was repeated with the addition of LiOH salt to the fiber/adsorbent suspension and before the retention aid and binder were added.

EXAMPLE 9

Handsheets from examples 7 and 8 were activated at 400° C. for 10 hours in the flow of nitrogen in the oven and were again activated at 400° C. for 1 h in-situ during adsorption measurements. The effective nitrogen capacity and $N_{2/O2}$ selectivites as defined in example 6 are given in Table 4.

TABLE 4

Influence of the addition of LiOH on adsorption capacity and selectivities of L1-17 embedded sheets

| | Effective $N_2$ capacity mmol/g | N2/O2 selectivity | |
|---|---|---|---|
| | | 1000 mbar | 300 mbar |
| Sheet from example 7 | 0.569 | 5.5 | 7.8 |
| Sheet from example 8 | 0.574 | 6.5 | 9.1 |

EXAMPLE 10

Handsheets were calcined at 580° C. in air to decompose all non-zeolitic material. The resulting white zeolite powder samples from handsheets of examples 7 and 8 were analyzed by ICP-AES as described in EXAMPLE 7 and the results are given in Table 5.

TABLE 5

LiRELSX in handsheet with and without LiOH addition.

| Sample | Relative Li content |
|---|---|
| Sheet from example 7 | 0.886 |
| Sheet from example 8 | 0.964 |

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A method of preparing an adsorbent sheet, wherein said adsorbent comprises a lithium ion exchanged type X zeolite from a slurry comprising a mixture of said adsorbent, binder, fiber, and flocculating agent in deionized water, the improvement comprising adding to said slurry a lithium salt to inhibit leaching out of lithium ions already present in said adsorbent.

2. The method as claimed in claim 1 wherein said slurry is used to make the sheet either in a laboratory handsheet mold apparatus or a Fourdrinier or Twin-Wire paper machine.

3. The method as claimed in claim 1 wherein said sheet is formed into a shaped monolith adsorbent.

4. The method as claimed in claim 1 wherein said type X zeolite contains lithium, lithium and bivalent cations, or lithium and trivalent cations.

5. The method as claimed in claim 1 wherein said type X zeolite has an Si/Al molar ratio of about 0.9 to about 1.25.

6. The method as claimed in claim 1 wherein said X type zeolite has an Si/Al molar ratio of about 1.0 to 1.1.

7. The method as claimed in claim 1 wherein said X type zeolite has an Si/Al ratio of about 1.0.

8. The method as claimed in claim 1 wherein said type X zeolite contains lithium, lithium and bivalent cations, or lithium and trivalent cations, and has an Si/Al ratio of about 1.0 to 1.1.

9. The method as claimed in claim 1 where said type X zeolite contains lithium, lithium and bivalent cations, or lithium and trivalent cations, and the lithium content is greater than 50% of the total charge-compensating cations.

10. The method as claimed in claim 4 where the lithium content is greater than 50% of the total charge-compensating cations.

11. The method as claimed in claim 9 wherein said type X zeolite contains lithium, lithium and bivalent cations, or lithium and trivalent cations, and has an Si/Al ratio of about 1.0 to 1.1.

12. The method as claimed in claim 9 wherein said type X zeolite contains lithium, lithium and bivalent cations, or lithium and trivalent cations, and the lithium content is greater than 80% of the total charge-compensating cations.

13. A method for applying a slurry comprising a binder and a lithium ion exchanged type X zeolite adsorbent to a substrate, the improvement comprising mixing said binder and a lithium salt in deionized water prior to applying said slurry to said substrate to inhibit leaching out of lithium ions already present in said adsorbent.

14. The method as claimed in claim 13 wherein said slurry further comprises a pore filling agent.

15. The method as claimed in claim 14 wherein said slurry further comprises a suspending agent.

16. The method as claimed in claim 13 wherein said substrate is selected from the group consisting of flat sheets, corrugated sheets, metal foils, and meshes selected from the group consisting of metal, glass fiber and polymeric materials.

17. The method as claimed in claim 13 wherein said substrate may contain zeolite particles either or both surfaces or sides.

18. The method as claimed in claim 13 wherein said slurry is applied by spraying, dipping or roller printing.

19. The method as claimed in claim 13 wherein said type X zeolite contains lithium, lithium and bivalent cations, or lithium and trivalent cations.

20. The method as claimed in claim 13 wherein said X type zeolite has an Si/Al molar ratio of about 0.9 to about 1.25.

21. The method as claimed in claim 13 wherein said X type zeolite has an Si/Al molar ratio of about 1.0 to 1.1.

22. The method as claimed in claim 13 wherein said X type zeolite has an Si/Al ratio of about 1.0.

23. The method as claimed in claim 13 wherein said type X zeolite contains lithium, lithium and bivalent cations, or lithium and trivalent cations, and has an Si/Al ratio of about 1.0 to 1.1.

24. The method as claimed in claim 13 where said type X zeolite contains lithium, lithium and bivalent cations, or lithium and trivalent cations, and t he lithium content is greater than 50% of the total charge-compensating cations.

25. The method as claimed in claim 19 where the lithium content is greater than 50% of the total charge-compensating cations.

26. The method as claimed in claim 13 wherein said type X zeolite contains lithium, lithium and bivalent cations, or lithium and trivalent cations, and has an Si/Al ratio of about 1.0 to 1.1.

27. The method as claimed in claim 13 wherein said type X zeolite contains lithium, lithium and bivalent cations, or lithium and trivalent cations, and the lithium content is greater than 80% of the total charge-compensating cations.

28. A method of separating a first gaseous component from a gas mixture comprising said first gaseous component and a second gaseous component comprising:

(a) passing the gaseous mixture into an adsorption zone containing a monolith adsorbent which is formed from an adsorbent containing sheet wherein said adsorbent comprises a lithium ion exchanged type X zeolite prepared from a slurry comprising a mixture of fiber, binder, said adsorbent and flocculating agent in deionized water and a lithium salt, thereby inhibiting leaching out of lithium ions already present in said adsorbent; wherein said monolith adsorbent is capable of separating said first gaseous component from said second gaseous component; and (b) recovering the non-preferentially adsorbed gaseous component from said adsorption zone.

29. The method as claimed in claim 28 wherein said gaseous mixture is air and said first and said second gaseous components are oxygen and nitrogen.

30. The method as claimed in claim 28 wherein said type X zeolite contains lithium, lithium and bivalent cations, or lithium and trivalent cations.

31. The method as claimed in claim 28 wherein said type X zeolite has an Si/Al molar ratio of about 0.9 to about 1.25.

32. The method as claimed in claim 28 wherein said X type zeolite has an Si/Al molar ratio of about 1.0 to 1.1.

33. The method as claimed in claim 28 wherein said X type zeolite has an Si/Al ratio of about 1.0.

34. The method as claimed in claim 28 wherein said type X zeolite contains lithium, lithium and bivalent cations, or lithium and trivalent cations, and has an Si/Al ratio of about 1.0 to 1.1.

35. The method as claimed in claim 28 wherein the lithium content is greater than 50% of the total charge-compensating cations.

36. The method as claimed in claim 35 wherein said type X zeolite contains lithium, lithium and bivalent cations, or lithium and trivalent cations, and has an Si/Al ratio of about 1.0 to 1.1.

37. The method as claimed in claim 36 wherein said type X zeolite contains lithium, lithium and bivalent cations, or lithium and trivalent cations, and the lithium content is greater than 80% of the total charge-compensating cations.

38. The method as claimed in claim 28 wherein said slurry further comprises a binder.

39. The method as claimed in claim 28 wherein said slurry further comprises a retention aid.

40. The method as claimed in claim 28 wherein said monolith adsorbent is prepared by creating a slurry comprising a binder, lithium ion exchanged type X zeolite and a lithium salt in deionized water, to inhibit the leaching out of lithium ions already present in said monolith adsorbent and applying said slurry to a substrate.

* * * * *